United States Patent
Taki et al.

(10) Patent No.: US 7,801,178 B2
(45) Date of Patent: Sep. 21, 2010

(54) IEEE 1394 TRANSMITTER, IEEE 1394 RECEIVER AND AUDIO DATA CONTENT TRANSMISSION METHOD

(75) Inventors: Nobuhiro Taki, Kasugai (JP); Hirotaka Ueno, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 273 days.

(21) Appl. No.: 12/046,684

(22) Filed: Mar. 12, 2008

(65) Prior Publication Data

US 2008/0304517 A1      Dec. 11, 2008

(30) Foreign Application Priority Data

Mar. 15, 2007   (JP)   ............................. 2007-066687

(51) Int. Cl.
   *H04J 3/16*   (2006.01)
   *H04N 7/00*   (2006.01)
(52) U.S. Cl. ................. 370/471; 370/470; 348/E5.122; 348/E7.024
(58) Field of Classification Search ................. 370/389, 370/458–538, 395.62, 392; 725/28, 29; 375/E7.019, 375/E7.024; 348/E5.096, E5.122, E7.031, 348/E7.024, 483, 485, E7.056; 714/37; 386/E5.07, 386/E5.004; 380/270
See application file for complete search history.

(56) References Cited

U.S. PATENT DOCUMENTS

| | | | |
|---|---|---|---|
| 6,675,384 B1 * | 1/2004 | Block et al. ................... 725/28 |
| 2003/0231334 A1 * | 12/2003 | Nagai et al. ................. 358/1.14 |
| 2005/0022061 A1 * | 1/2005 | Ozasa et al. ................... 714/37 |

FOREIGN PATENT DOCUMENTS

JP        2005-25270         1/2005

* cited by examiner

*Primary Examiner*—Afsar M. Qureshi
(74) *Attorney, Agent, or Firm*—Staas & Halsey LLP (57) ABSTRACT

There is provided an IEEE 1394 transmitter for transmitting a plurality of audio data contents, having an audio data generator configured to sample the plurality of audio data contents sequentially to generate format data of an audio data content; and an IEEE 1394 transmission controller configured to add an IEEE 1394 header packet to the format data of the audio data content.

13 Claims, 13 Drawing Sheets

| data_length | | | | | | | tag | channel | tcode | sy |
|---|---|---|---|---|---|---|---|---|---|---|
| header_CRC ||||||||||||
| 0 0 | SID | DBS | FN | QPC | SPH | rsv | DBC |||
| 1 0 | FMT | FDF | SYT ||||||
| 1 1 0 1 0 0 0 0 | 0 0 0 0 0 0 0 1 | Ancillary Data ||
| 1 1 0 1 0 0 0 0 | 0 0 0 0 0 0 0 1 | Ancillary Data ||
| 0 1 0 0 X X X X | Ch1 Audio Data |||
| 0 1 0 0 X X X X | Ch2 Audio Data |||
| 0 1 0 0 X X X X | Ch3 Audio Data |||
| 0 1 0 0 X X X X | Ch4 Audio Data |||
| 1 1 0 1 0 0 0 0 | 0 0 0 0 0 0 0 1 | Ancillary Data ||
| 1 1 0 1 0 0 0 0 | 0 0 0 0 0 0 0 1 | Ancillary Data ||
| 0 1 0 0 X X X X | Ch1 Audio Data |||
| 0 1 0 0 X X X X | Ch2 Audio Data |||
| 0 1 0 0 X X X X | Ch3 Audio Data |||
| 0 1 0 0 X X X X | Ch4 Audio Data |||
| Data CRC ||||

FIG. 4

| data_length | | tag | channel | tcode | sy |
|---|---|---|---|---|---|
| header_CRC | | | | | |
| 0 0 | SID | DBS | FN | QPC | SPH | rsv | DBC |
| 1 0 | FMT | FDF | SYT | | |
| XXXXXXX | XXXXXXX | XXXX(Ancillary Data) | | | |
| XXXXXXX | XXXXXXX | XXXX(Ancillary Data) | | | |
| XXXXXXX | X X X X (Ch1 Audio Data) | | | | |
| XXXXXXX | X X X X (Ch2 Audio Data) | | | | |
| XXXXXXX | XXXXXXX | XXXX(Ancillary Data) | | | |
| XXXXXXX | XXXXXXX | XXXX(Ancillary Data) | | | |
| XXXXXXX | X X X X (Ch1 Audio Data) | | | | |
| XXXXXXX | X X X X (Ch2 Audio Data) | | | | |
| Data CRC | | | | | |

FIG. 5

| data_length | | | | | | | | | | | | | | | tag | | | channel | | | | tcode | | | | sy | | |
|---|---|---|---|---|---|---|---|---|---|---|---|---|---|---|---|---|---|---|---|---|---|---|---|---|---|---|---|---|
| header_CRC ||||||||||||||||||||||||||||| |
| 0 | 0 | SID ||||| DBS ||||||| FN ||| QPC ||| SPH | rsv || DBC |||||||
| 1 | 0 | FMT ||||| FDF ||||||| SYT ||||||||||||||||
| 1 | 1 | 0 | 1 | 0 | 0 | 0 | 0 | 0 | 0 | 0 | 0 | 0 | 0 | 0 | 1 | Ancillary Data |||||||||||||
| 1 | 1 | 0 | 1 | 0 | 0 | 0 | 0 | 0 | 0 | 0 | 0 | 0 | 0 | 0 | 1 | Ancillary Data |||||||||||||
| 0 | 1 | 0 | 0 | X | X | X | X | Ch1 Audio Data |||||||||||||||||||||
| 0 | 1 | 0 | 0 | X | X | X | X | Ch2 Audio Data |||||||||||||||||||||
| 1 | 1 | 0 | 1 | 0 | 0 | 0 | 0 | 0 | 0 | 0 | 0 | 0 | 0 | 0 | 1 | Ancillary Data |||||||||||||
| 1 | 1 | 0 | 1 | 0 | 0 | 0 | 0 | 0 | 0 | 0 | 0 | 0 | 0 | 0 | 1 | Ancillary Data |||||||||||||
| 0 | 1 | 0 | 0 | X | X | X | X | Ch1 Audio Data |||||||||||||||||||||
| 0 | 1 | 0 | 0 | X | X | X | X | Ch2 Audio Data |||||||||||||||||||||
| Data CRC |||||||||||||||||||||||||||||

| D0₁₆ | 01₁₆ | Ancillary Data |
|---|---|---|
| D0₁₆ | 02₁₆ | Ancillary Data |
| 4X₁₆ | | Data Channel 1 |
| 4X₁₆ | | Data Channel 2 |
| 4X₁₆ | | Data Channel 3 |
| 4X₁₆ | | Data Channel 4 |
| 4X₁₆ | | Data Channel 5 |
| 4X₁₆ | | Data Channel 6 |
| 4X₁₆ | | Data Channel 7 |
| 4X₁₆ | | Data Channel 8 |

| data_length | | | | | | | tag | channel | tcode | sy |
|---|---|---|---|---|---|---|---|---|---|---|
| header_CRC | | | | | | | | | | |
| 0 0 | SID | DBS | | FN | QPC | SPH | rsv | DBC | | |
| 1 0 | FMT | FDF | | SYT | | | | | | |
| X X X X X X X X | | X X X X X X X X | | XXXX(Ancillary Data) | | | | | | |
| X X X X X X X X | | X X X X X X X X | | XXXX(Ancillary Data) | | | | | | |
| 0 1 0 0 X X X X | | Ch1 Audio Data | | | | | | | | |
| 0 1 0 0 X X X X | | Ch2 Audio Data | | | | | | | | |
| 0 1 0 0 X X X X | | Ch3 Audio Data | | | | | | | | |
| 0 1 0 0 X X X X | | Ch4 Audio Data | | | | | | | | |
| X X X X X X X X | | X X X X (Ch5 Audio Data) | | | | | | | | |
| X X X X X X X X | | X X X X (Ch6 Audio Data) | | | | | | | | |
| 0 1 0 0 X X X X | | Ch7 Audio Data | | | | | | | | |
| 0 1 0 0 X X X X | | Ch8 Audio Data | | | | | | | | |
| X X X X X X X X | | X X X X X X X X | | XXXX(Ancillary Data) | | | | | | |
| X X X X X X X X | | X X X X X X X X | | XXXX(Ancillary Data) | | | | | | |
| 0 1 0 0 X X X X | | Ch1 Audio Data | | | | | | | | |
| 0 1 0 0 X X X X | | Ch2 Audio Data | | | | | | | | |
| 0 1 0 0 X X X X | | Ch3 Audio Data | | | | | | | | |
| 0 1 0 0 X X X X | | Ch4 Audio Data | | | | | | | | |
| X X X X X X X X | | X X X X (Ch5 Audio Data) | | | | | | | | |
| X X X X X X X X | | X X X X (Ch6 Audio Data) | | | | | | | | |
| 0 1 0 0 X X X X | | Ch7 Audio Data | | | | | | | | |
| 0 1 0 0 X X X X | | Ch8 Audio Data | | | | | | | | |
| Data CRC | | | | | | | | | | |

IEEE 1394 TRANSMITTER, IEEE 1394 RECEIVER AND AUDIO DATA CONTENT TRANSMISSION METHOD

CROSS-REFERENCE TO RELATED APPLICATIONS

This application is based upon and claims the benefit of priority from Japanese Patent Application No. 2007-066687 filed on Mar. 15, 2007, the entire contents of which are incorporated herein by reference.

BACKGROUND OF THE INVENTION

1. Field of the Invention

The application relates to an IEEE (Institute of Electrical and Electronics Engineers) 1394 transmitter.

2. Description of the Related Art

Japanese Laid-open Patent Publication No. 2005-025270 discloses a technique for transmitting and receiving content using the IEEE 1394 standard.

SUMMARY

According to an aspect of an embodiment of the present invention, there is provided an IEEE 1394 transmitter for transmitting a plurality of audio data contents, comprising: an audio data generator configured to sample the plurality of audio data contents sequentially to generate format data of an audio data content; and an IEEE 1394 transmission controller configured to add an IEEE 1394 header packet to the format data of the audio data content.

The above-described embodiments of the present invention are intended as examples, and all embodiments of the present invention are not limited to including the features described above.

Additional advantages and novel features of the invention will be set forth in part in the description that follows, and in part will become more apparent to those skilled in the art upon examination of the following or upon learning by practice of the invention.

DESCRIPTION OF THE PREFERRED EMBODIMENTS

Reference may now be made in detail to embodiments of the present invention, examples of which are illustrated in the accompanying drawings, wherein like reference numerals refer to like elements throughout.

Figure 1:
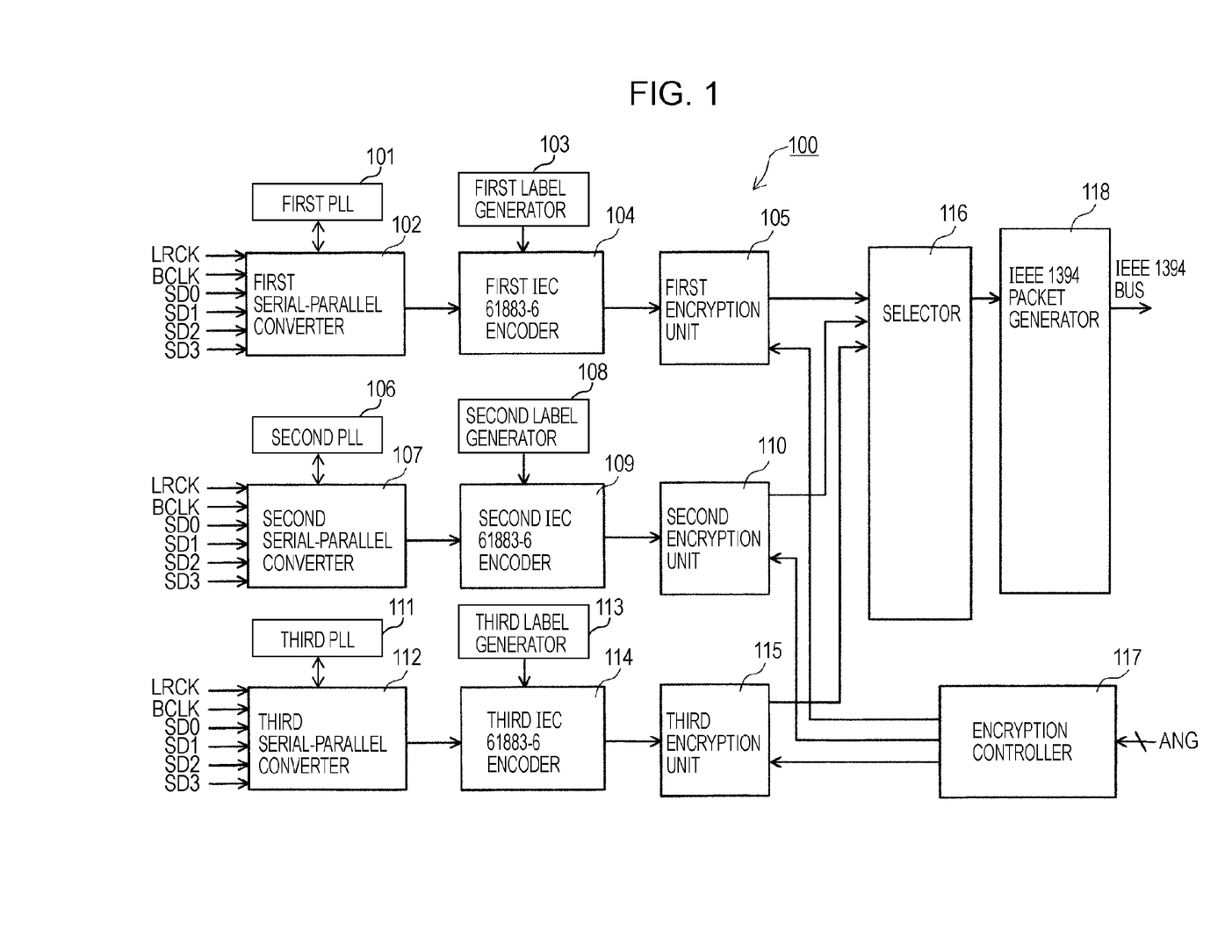
FIG. 1 is a diagram showing an IEEE 1394 transmitter.

When audio data of a plurality of contents is transmitted using the IEEE 1394 standard, for example, an IEEE 1394 packet is transmitted by an IEEE 1394 transmitter 100 shown in FIG. 1 using the IEC (International Electrotechnical Commission) 61883-6 standard.

The IEEE 1394 transmitter 100 is configured to transmit three audio data contents each having eight channels. A first audio data content input from a three-wire interface is converted into parallel sampled audio data by a first phase-locked loop (PLL) 101 and a first serial-parallel converter, and is output to a first IEC 61883-6 encoder 104. The first IEC 61883-6 encoder 104 attaches a label generated by a first label generator 103 to the sampled audio data, and outputs the label-attached sampled audio data to a first encryption unit 105. The first encryption unit 105 encrypts the label-attached sampled audio data according to an output of an encryption controller 117. The encryption controller 117 sets a level for encrypting the data to the first encryption unit 105 on the basis of an encryption setting signal ANG input from outside.

Second and third audio data contents are also processed in a similar manner. The resulting first, second, and third audio data contents are input to a selector 116. The selector 116 selects one of the first to third audio contents, and outputs the selected content to an IEEE 1394 packet generator 118. The IEEE 1394 packet generator 118 attaches a header to data of each of the first to third audio contents, and transmits an IEEE 1394 packet to the outside.

Figure 2:
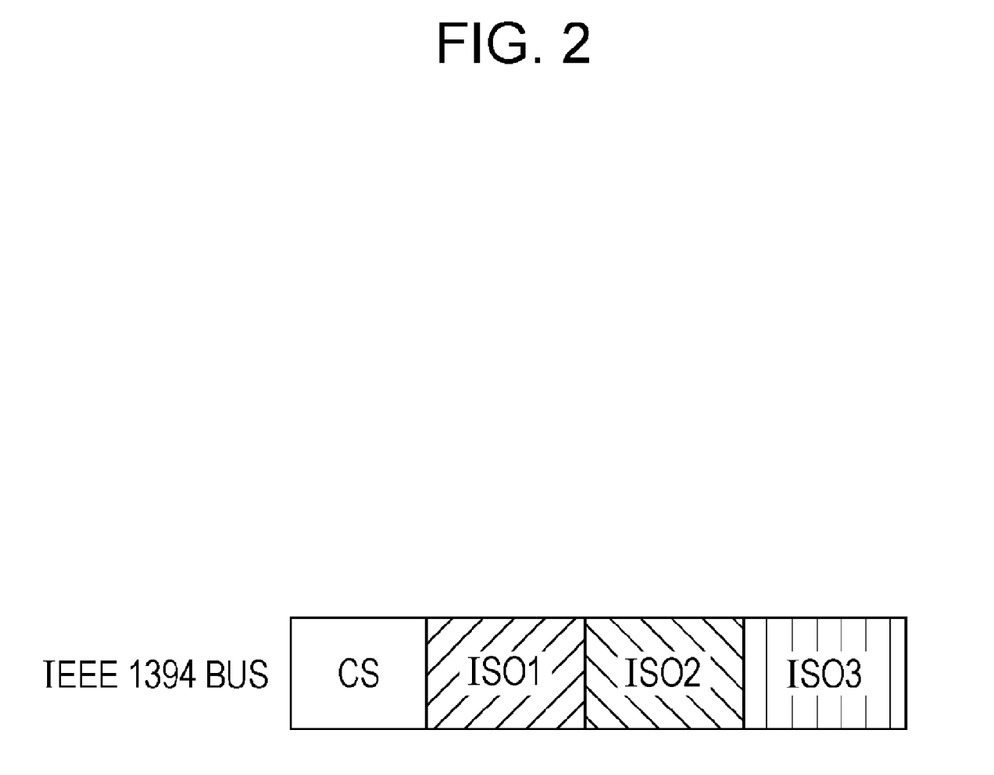
FIG. 2 is a diagram showing an IEEE 1394 packet.
Figure 3:
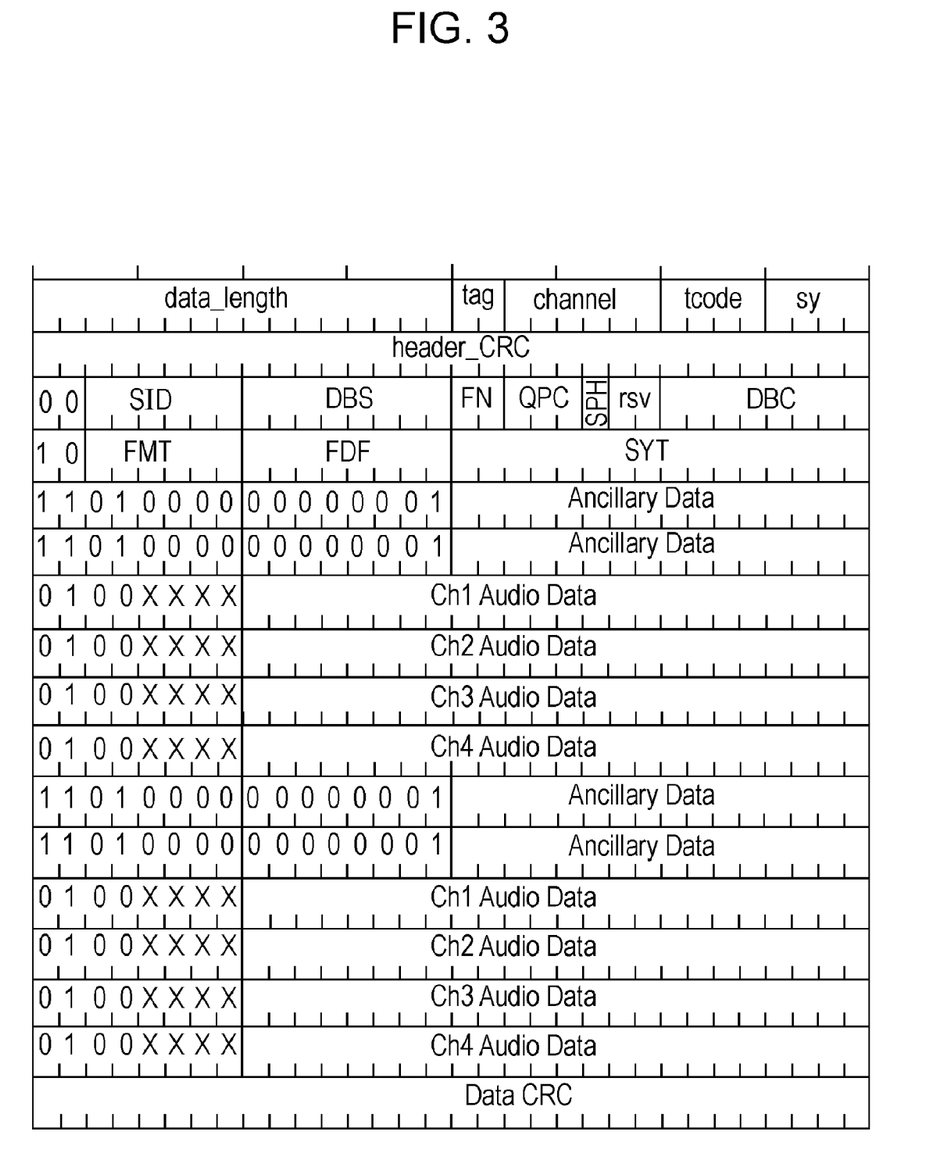
FIG. 3 is a diagram showing a structure of an isochronous packet (ISO1) of a first audio data content.
Figure 4:
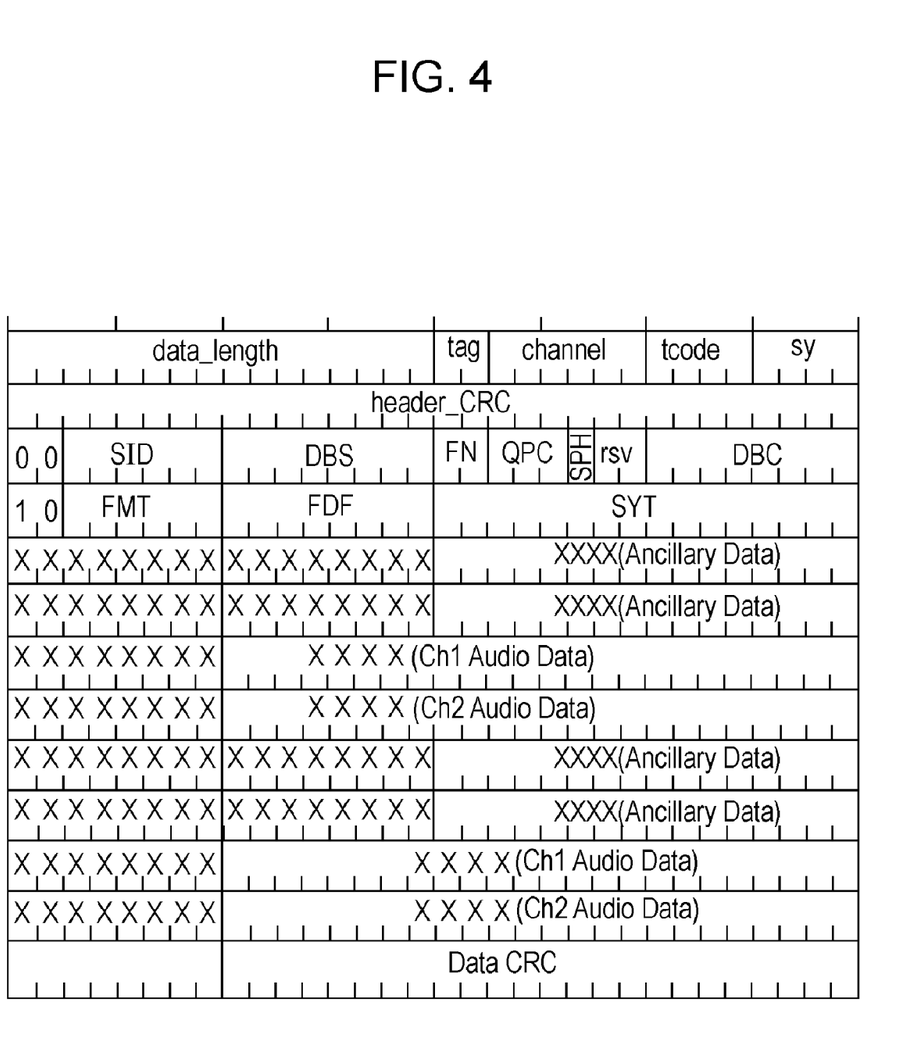
FIG. 4 is a diagram showing a structure of an isochronous packet (ISO2) of a second audio data content.
Figure 5:
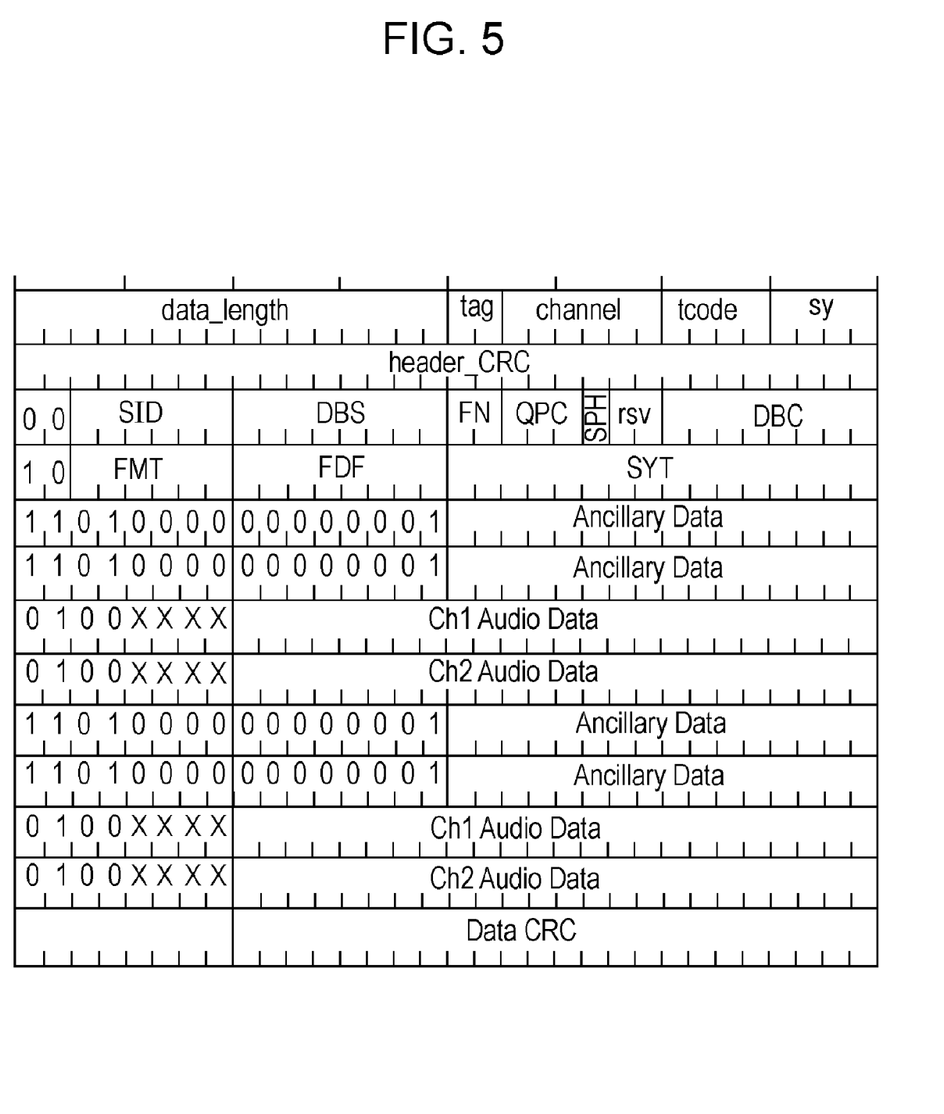
FIG. 5 is a diagram showing a structure of an isochronous packet (ISO3) of a third audio data content.

FIGS. 2 to 5 show an example in which a first audio data content of four channels, a second audio data content of two channels, and a third audio data content of two channels are transmitted by IEEE 1394 packet transmission. As shown in FIG. 2, an IEEE 1394 packet includes a cycle start packet (CS), an isochronous packet ISO1 of the first audio data content shown in FIG. 3, an isochronous packet ISO2 of the second audio data content shown in FIG. 4, and an isochronous packet ISO3 of the third audio data content shown in FIG. 5. Each of the packets ISO1 to ISO3 has an isochronous header and a common isochronous packet (CIP) header attached to the top thereof. Therefore, the IEEE 1394 transmitter 100 transmits an IEEE 1394 packet in which the isochronous header and the CIP header are attached to data of each audio data content.

However, when audio data contents of a plurality of channels are transmitted and received via an IEEE 1394 interface, a header is attached to each of the audio data contents. As a result, an overhead of an IEEE 1394 packet increases. Therefore, it is desirable to reduce the overhead of a packet when audio contents of a plurality of channels are transmitted and received via an IEEE 1394 interface.

Figure 6:
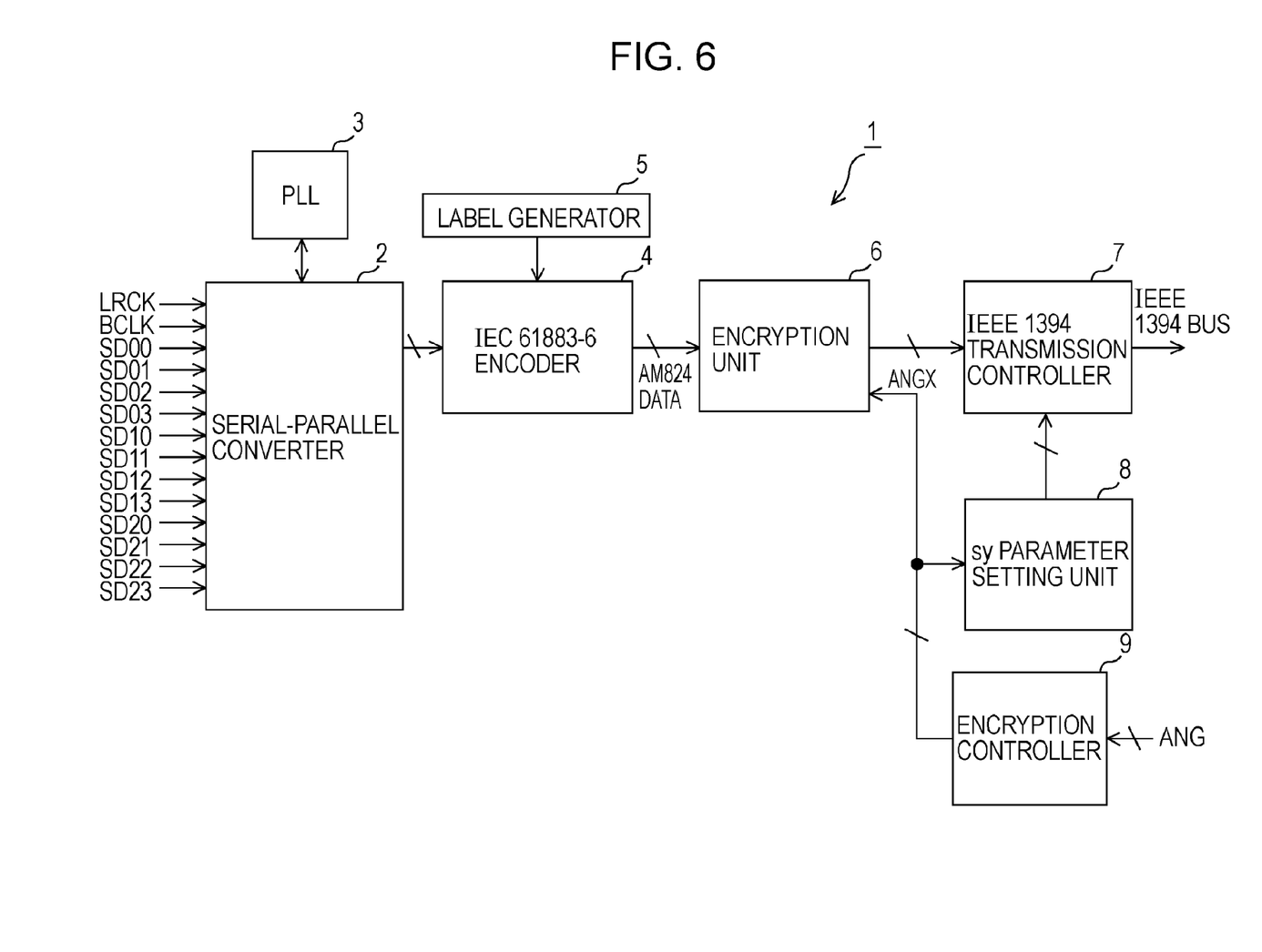
FIG. 6 is a block diagram showing an IEEE 1394 transmitter in accordance with an embodiment of the present invention.

FIG. 6 is a block diagram of an IEEE 1394 transmitter 1 according to a first embodiment of the present invention. The IEEE 1394 transmitter 1 converts up to 24 audio data contents input via a three-wire interface into an IEEE 1394 packet, encrypts the packet according to setting, and transmits the encrypted packet to an IEEE 1394 bus.

The IEEE 1394 transmitter 1 includes a serial-parallel converter 2, a PLL 3, an IEC 61883-6 encoder 4, a label generator 5, an encryption unit 6, an IEEE 1394 transmission controller 7, an sy parameter setting unit 8, and an encryption controller 9.

The serial-parallel converter 2 converts up to 24 audio data contents input via the three-wire interface into parallel sampled audio data.

The IEEE 1394 transmitter 100 shown in FIG. 1 includes three PLLs, namely, the first PLL 101, the second PLL 106 and the third PLL 111. The IEEE 1394 transmitter 1 according to the first embodiment includes a single PLL, namely, the PLL 3. The IEEE 1394 transmitter 1 can receive audio data contents using a common clock. Since only one PLL is required for clock control in the IEEE 1394 transmitter 1, the number of terminals of clocks can be reduced and a power consumption of the PLL can also be reduced.

The IEC 61883-6 encoder 4 and the label generator 5 convert the sampled audio data into audio data complying with the IEC 61883-6 format.

Figure 7:
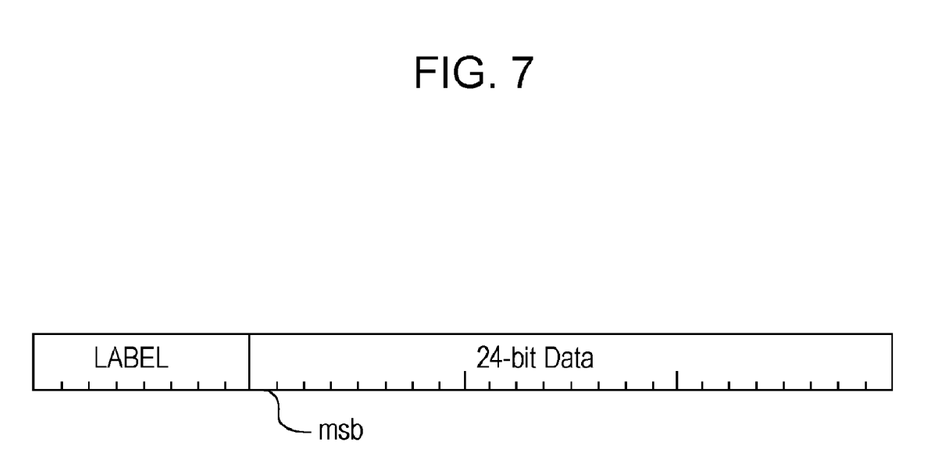
FIG. 7 is a diagram showing a standard AM824 data format in accordance with an embodiment of the present invention.
Figure 8:
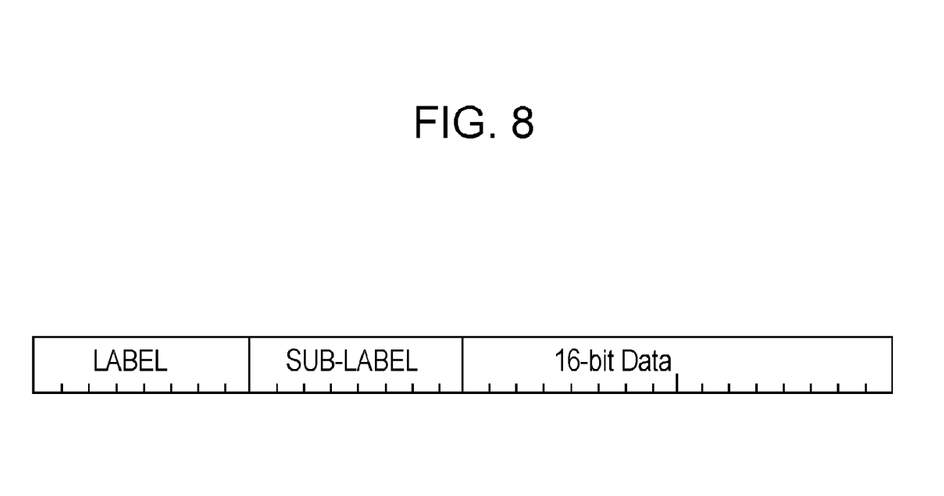
FIG. 8 is a diagram showing a sub-label-attached AM824 data format in accordance with an embodiment of the present invention.

FIG. 7 shows a standard AM824 data format. The individual sampled audio data is converted to the standard AM824 data format in the IEC 61883-6 format by attaching a label. FIG. 8 shows a sub-label-attached AM824 data format. In the sub-label-attached AM824 data format in the IEC 61883-6 format, two labels, i.e., a label and a sub-label, are attached to the top of data.

Figure 9:
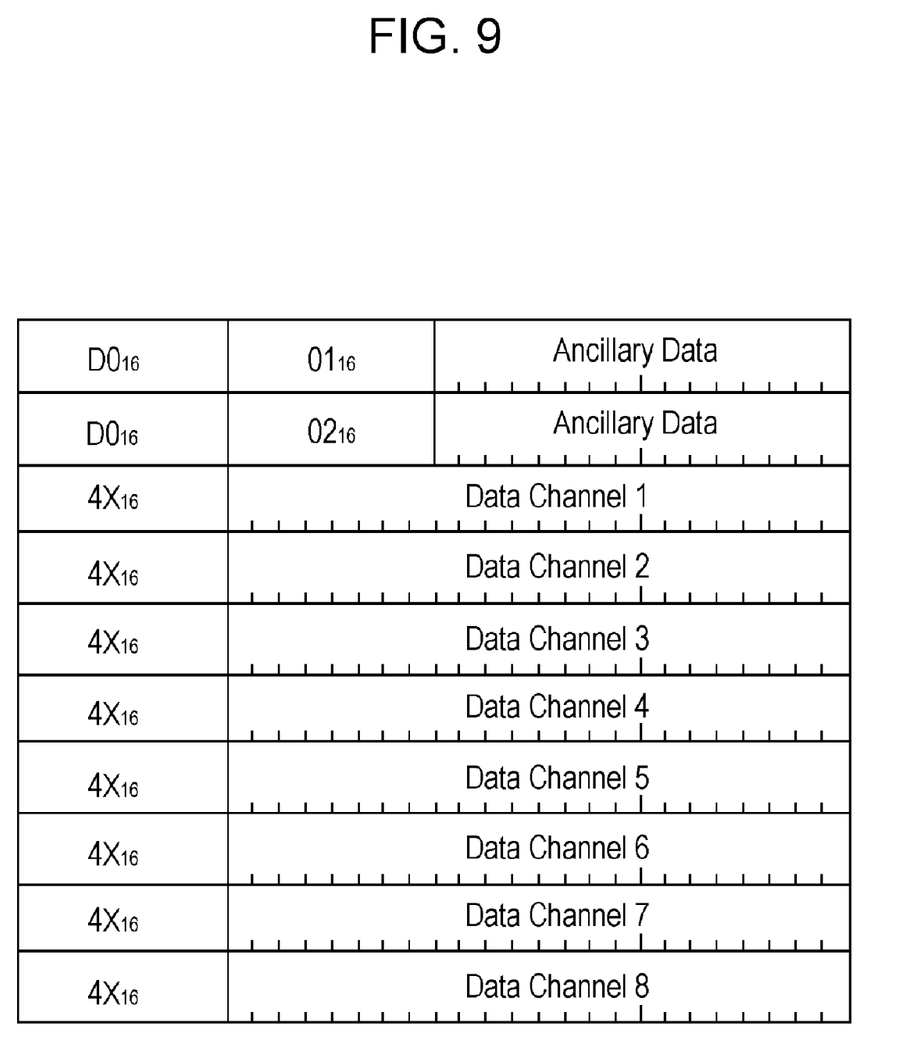
FIG. 9 is a diagram showing audio data content of eight channels in accordance with an embodiment of the present invention.

FIG. 9 shows audio data content of eight channels. The audio data content of eight channels is composed of two quadlets of sub-label-attached AM824 data at the top thereof, followed by standard AM824 data for the eight channels. Ancillary Data included in the sub-label-attached AM824 data contains information relating to the audio data content, such as compression information of the audio data content.

The encryption unit 6 encrypts the AM824 data output from the IEC 61883-6 encoder 4 using the 5C-DTCP (5 Company Digital Transmission Content Protection) protocol according to an encryption instruction signal ANGX output from the encryption controller 9. The encryption controller 9 outputs the encryption instruction signal ANGX on the basis of an encryption signal ANG input from outside.

Figure 10:
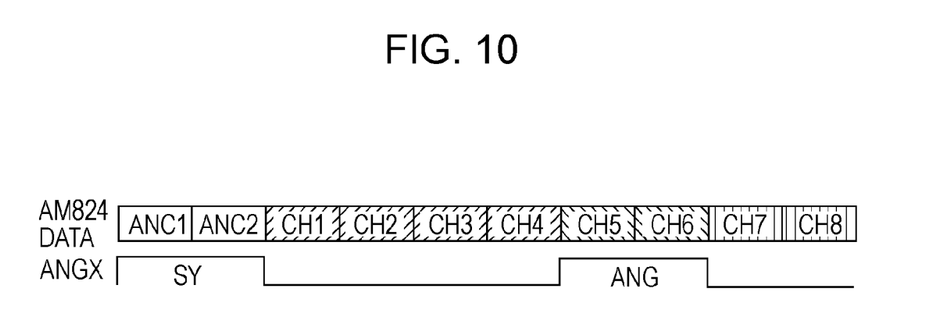
FIG. 10 is a timing chart of an encryption instruction signal ANGX in accordance with an embodiment of the present invention.

FIG. 10 is a timing chart of the encryption instruction signal ANGX output from the encryption controller 9. The two sets of Ancillary Data (in FIG. 10, ANC1 and ANC2) placed at the top of the AM824 data are encrypted using a sy parameter with the highest restrictiveness. The data of channels to be encrypted (in FIG. 10, CH5 and CH6) is encrypted according to the encryption signal ANG.

The copy levels include, in ascending order of restrictiveness, copy-free, copy-one-generation, and copy-never. The sy parameter setting unit 8 sets the sy parameter to the highest-restrictiveness copy level based on the encryption instruction signal ANGX.

Specifically, when the encryption instruction signal ANGX includes copy-free only, the sy parameter is set to copy-free. When the encryption instruction signal ANGX includes copy-one-generation but does not include copy-never, the sy parameter is set to copy-one-generation. When the encryption instruction signal ANGX includes copy-never, the sy parameter is set to copy-never. Accordingly, the sy parameter is set to the highest-restrictiveness copy level based on the encryption instruction signal ANGX.

The IEEE 1394 transmission controller 7 attaches the isochronous header and the CIP (Common Isochronous Packet) header to the top of the IEC 61883-6 format data output from the encryption unit 6, and transmits an entire isochronous packet to the external IEEE 1394 bus.

Figure 11:
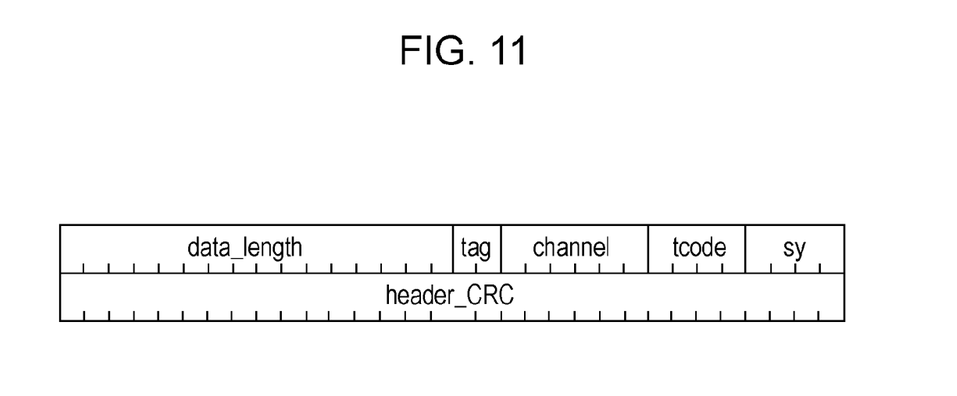
FIG. 11 is a diagram showing an isochronous packet header format in accordance with an embodiment of the present invention.

FIG. 11 shows an isochronous packet header format. A "data_length" parameter indicates the number of bytes in the entire isochronous packet. The "data_length" parameter is set to an arbitrary value. A "tag" parameter indicates that the packet contains the CIP header, and is set to a fixed value of 01. A "channel" parameter indicates a channel number used to identify the isochronous packet, and is set to an arbitrary value. A "tcode" parameter is a code indicating the type of the packet, and is set to value 1010 in the case of an isochronous packet. An sy parameter contains copy information in the audio format.

Figure 12:
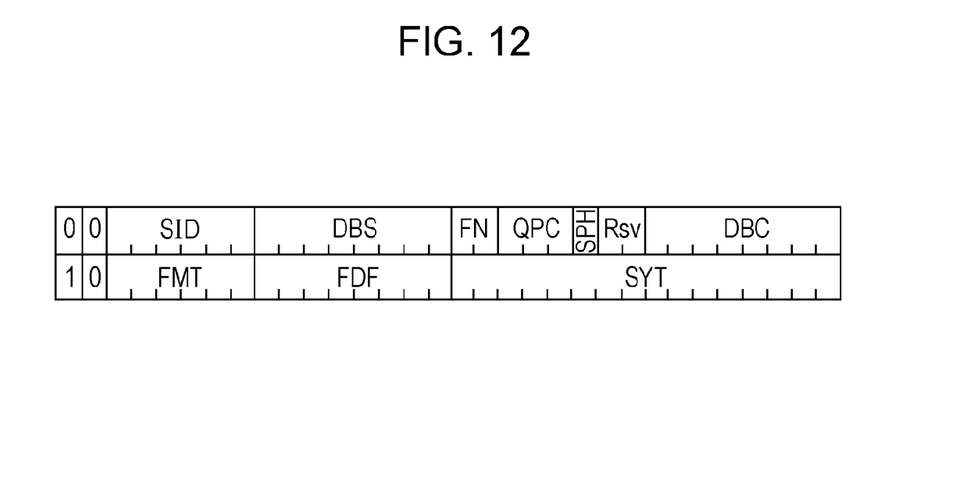
FIG. 12 is a diagram showing a CIP header format in accordance with an embodiment of the present invention.

FIG. 12 shows a CIP header format. A source-node-ID (SID) parameter indicates an ID of a source node that transmits the packet. The SID parameter is set to an arbitrary value. A data-block-size (DBS) parameter indicates the size of one divided data block, and is set to an arbitrary value. A fraction-number (FN) parameter indicates the number of data blocks into which one source packet is divided. Since the IEEE 1394 transmitter 1 does not divide a source packet, the FN parameter is set to a fixed value of 00. A quadlet-padding-count (QPC) parameter indicates the number of quadlets added for the division (a quadlet represents a data sequence of four bytes).

Since the IEEE 1394 transmitter 1 does not perform the division, the QPC parameter is set to a fixed value of 000. A source-packet-header (SPH) parameter indicates whether or not a source packet header has been attached. Since the IEEE 1394 transmitter 1 does not attach a source packet header, the SPH parameter is set to a fixed value of 0. An Rsv parameter is an extension region for future use.

In the IEEE 1394 transmitter 1, the Rsv parameter is set to a fixed value of 00. A data-block-continuity-counter (DBC) parameter indicates a continuity counter value of a data block, and is incremented by +1 each time one data block is transmitted. A format (FMT) parameter indicates a format type of data of the packet. Since the IEEE 1394 transmitter 1 handles an audio and music format, the FMT parameter is set to a fixed value of 010000. A format-dependent-field (FDF) parameter is a field depending on format, and is set to an arbitrary value. A time stamp value is set in an SYT parameter.

Figure 13:
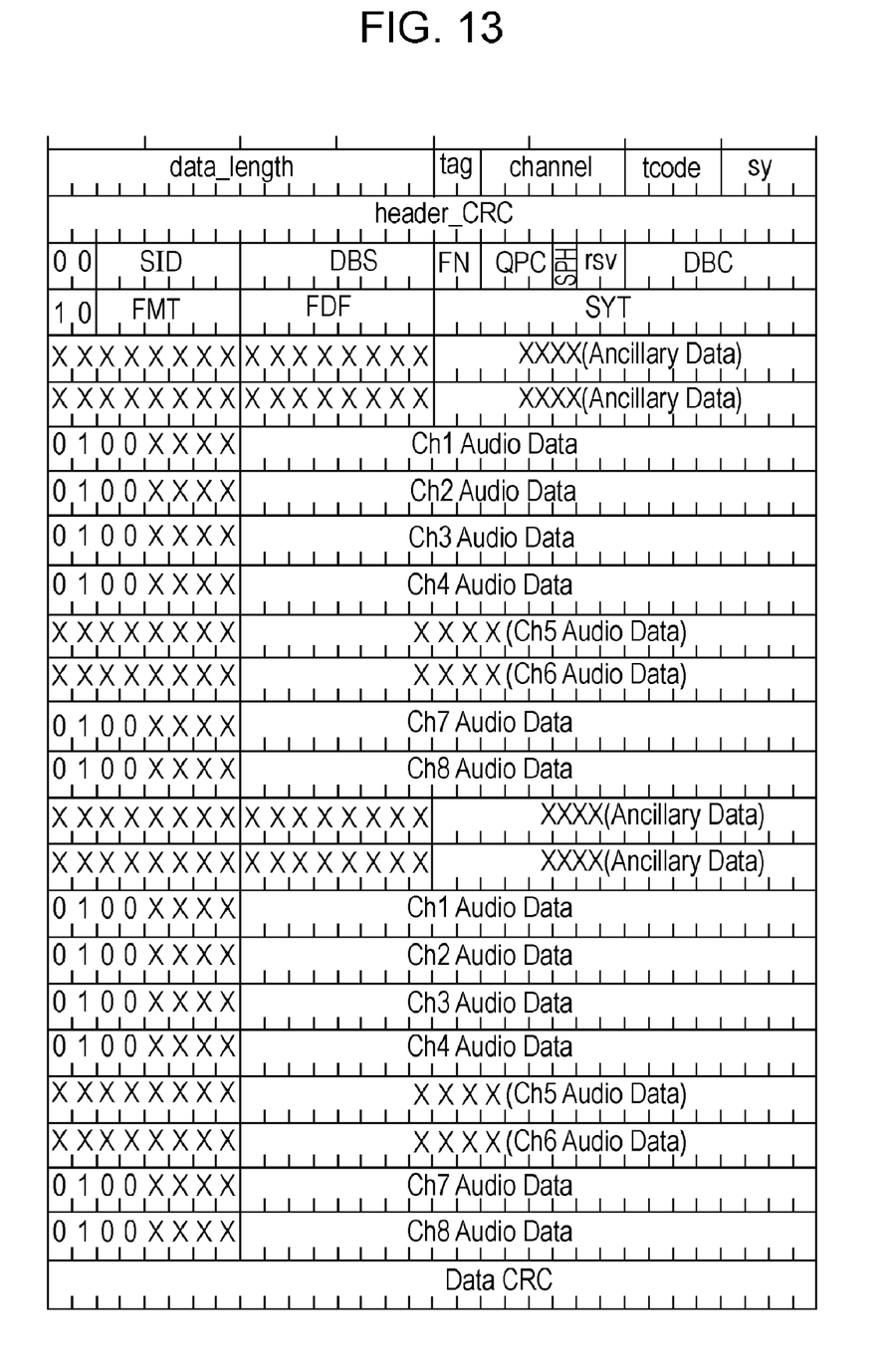
FIG. 13 is a diagram showing an isochronous packet in accordance with the first embodiment.

FIG. 13 shows a structure of an isochronous packet transmitted from the IEEE 1394 transmitter 1 according to the first embodiment. The isochronous packet is composed of an isochronous packet header, a CIP header, IEC 61883-6 data, and a CRC of the data. In the IEC 61883-6 data, the data of channels 5 and 6 is encrypted data, and therefore, the label of the data of channels 5 and 6 has a value other than 4X (expressed in hexadecimal notation, the same applies to the following description). The sub-label-attached AM824 format packet including Ancillary Data regarding channels 5 and 6 is also an encrypted packet. The sy parameter in the isochronous packet header is also set to the value corresponding to the level for encryption.

Figure 14:
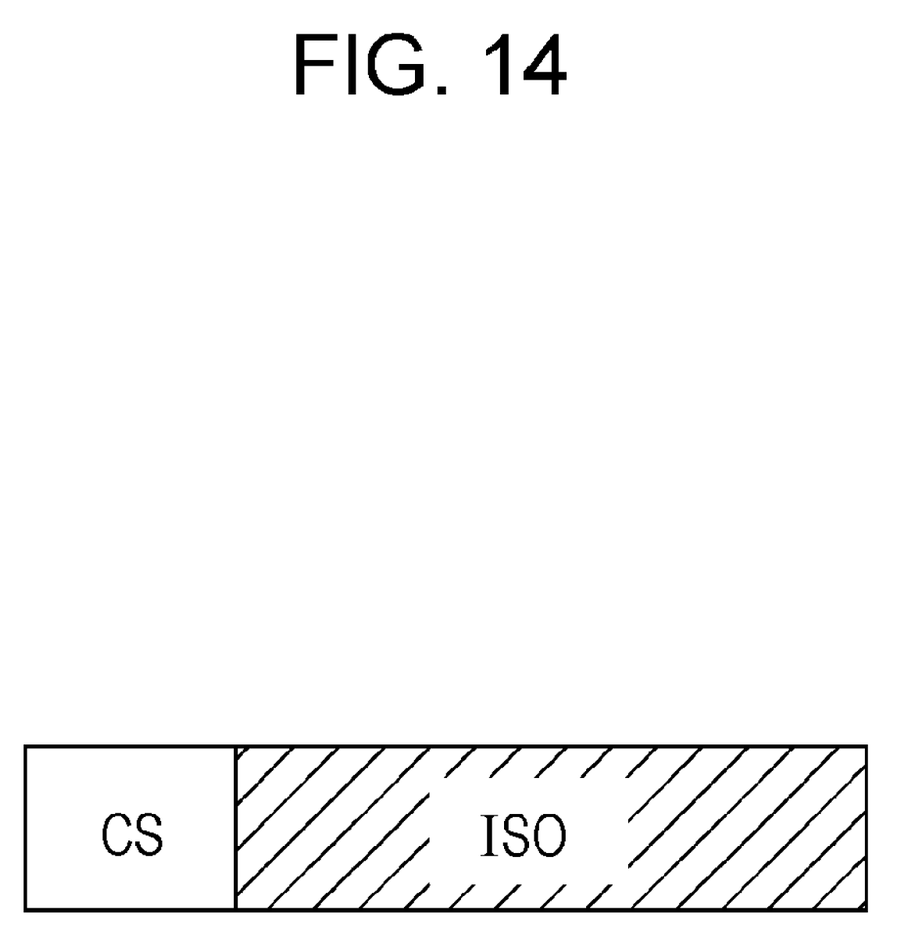
FIG. 14 is a diagram showing an IEEE 1394 packet in accordance with the first embodiment.

FIG. 14 shows an IEEE 1394 packet transmitted from the IEEE 1394 transmitter 1 according to the first embodiment. The IEEE 1394 packet is generated by inserting a cycle start packet (CS) before the isochronous packet structure (ISO) shown in FIG. 13, and is transmitted from the IEEE 1394 bus.

The IEEE 1394 transmitter 1 according to the first embodiment transmits audio data content of a plurality of channels through a single content packet. Therefore the IEEE 1394 transmitter 1 according to the first embodiment can handle a packet having a single header portion, and the overhead of the IEEE 1394 packet can be reduced.

Figure 15:
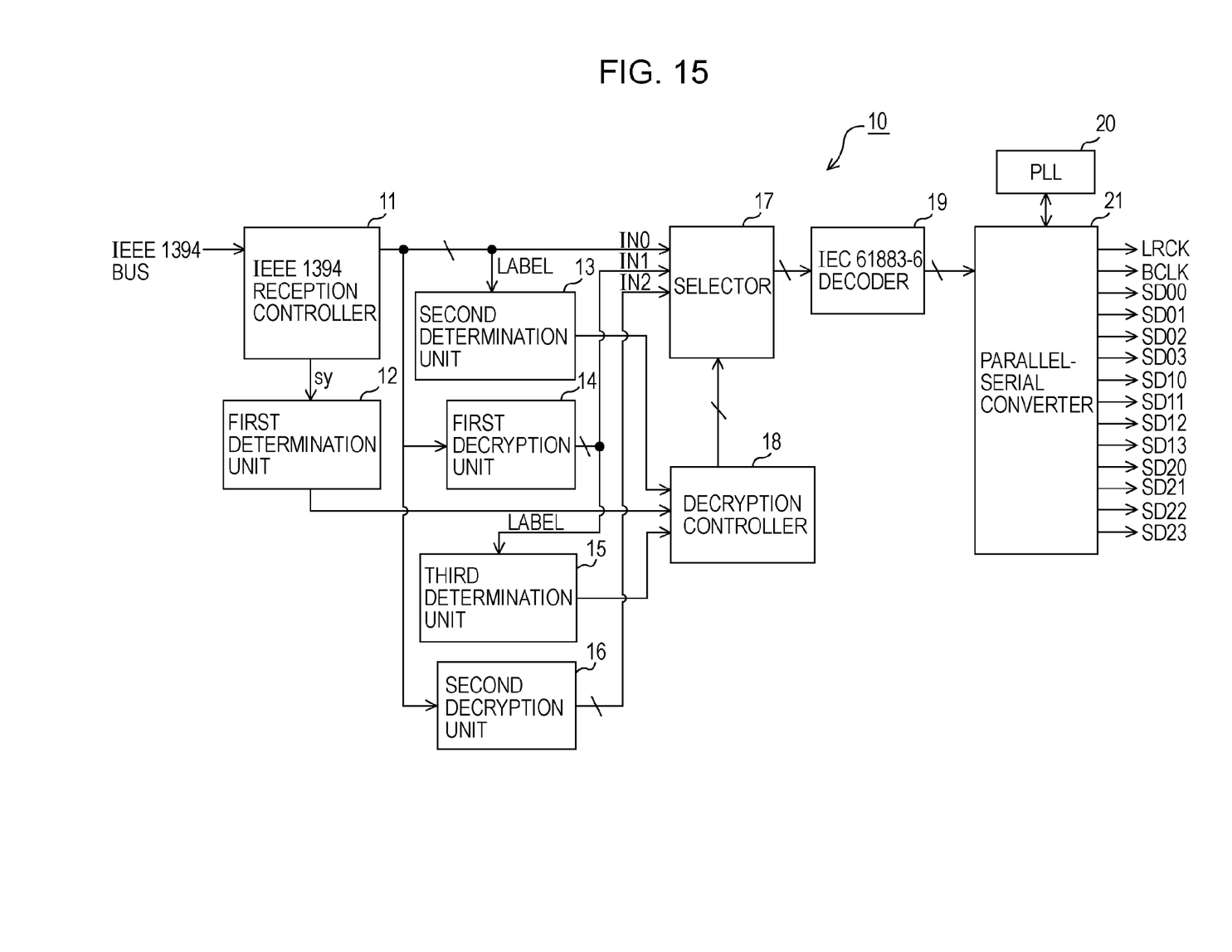
FIG. 15 is a block diagram of an IEEE 1394 receiver in accordance with an embodiment of the present invention.

FIG. 15 is a block diagram of an IEEE 1394 receiver 10 according to an embodiment of the present invention. The IEEE 1394 receiver 10 receives a packet from an IEEE 1394 bus, and transmits audio content to outside via a three-wire interface.

The IEEE 1394 receiver 10 includes an IEEE 1394 reception controller 11, a first determination unit 12, a second determination unit 13, a first decryption unit 14, a third determination unit 15, a second decryption unit 16, a selector 17, a decryption controller 18, an IEC 61883-6 decoder 19, a PLL 20, and a parallel-serial converter 21.

The IEEE 1394 reception controller 11 reads, from the packet transmitted from the IEEE 1394 bus, the sy parameter included in the isochronous packet header and the standard AM824 format data included in the IEC 61883-6 data, including the data channels, quadlet-by-quadlet.

The first determination unit 12 determines the copy level of the sy parameter, i.e., copy-free, copy-one-generation, or copy-never. The determination result is output to the decryption controller 18.

The second determination unit 13 receives a label in a quadlet of standard AM824 format data including a data channel read by the IEEE 1394 reception controller 11, and determines whether or not the label has a value of 4X. The determination result is output to the decryption controller 18.

The first decryption unit 14 decrypts the quadlet of data read by the IEEE 1394 reception controller 11 using the sy parameter. The decrypted data is output to an input terminal IN1 of the selector 17. The label in the decrypted data is output to the third determination unit 15.

The third determination unit 15 receives the label in the AM824 format data decrypted by the first decryption unit 14, and determines whether or not the label has a value of 4X. The determination result is output to the decryption controller 18.

The second decryption unit 16 decrypts the quadlet of data read by the IEEE 1394 reception controller 11 using a parameter other than the sy parameter. The decrypted result is output to an input terminal IN2 of the selector 17.

The quadlet of data read by the IEEE 1394 reception controller 11 is input to an input terminal IN0 of the selector 17. The output from the first decryption unit 14 is input to the input terminal IN1 of the selector 17. The output from the second decryption unit 16 is input to the input terminal IN2 of the selector 17. One of the signals input to the input terminals IN0 to IN2 is selected according to an output of the decryption controller 18, and is output to the IEC 61883-6 decoder 19.

The decryption controller 18 outputs a selection signal to the selector 17 according to the procedure for decrypting each audio data content on the basis of the determination signals output from the first determination unit 12, the second determination unit 13, and the third determination unit 15.

The IEC 61883-6 decoder 19, based on the audio data content separation information, which is a data removed the label from the AM824 format data output from the selector 17 and is input from an external device (not shown), outputs the audio data content to the parallel-serial converter 21.

The PLL 20 and the parallel-serial converter 21 output up to 24 audio data contents output from the IEC 61883-6 decoder 19 via a three-wire interface from data terminals SD00 to SD23 in synchronization with a common clock signal LRCK and a clock signal BCLK.

The IEEE 1394 receiver 10 according to the second embodiment is configured such that the single PLL 20 is used to transmit audio data using a common clock. In the IEEE 1394 receiver 10, therefore, only one PLL is required for clock control. As a result, the number of terminals of clocks can be reduced and a power consumption of the PLL can also be reduced.

Figure 16:
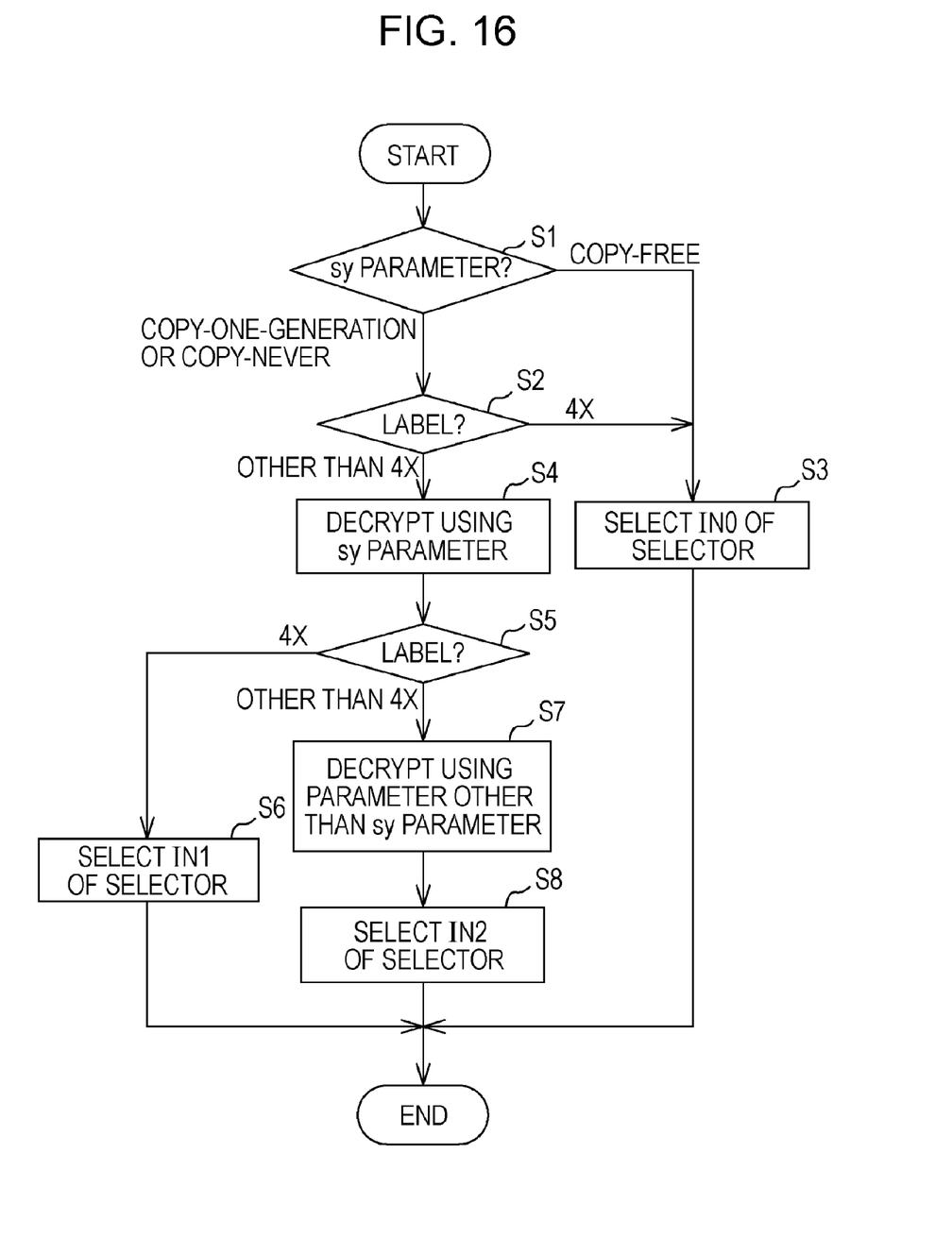
FIG. 16 is a flowchart showing a process for decrypting audio data content in accordance with an embodiment of the present invention.

FIG. 16 is a flowchart showing a process for decrypting audio data content.

In operation S1, the first determination unit determines whether the sy parameter indicates copy-free, copy-one-generation, or copy-never. If the sy parameter indicates copy-free, the process proceeds to operation S3. If the sy parameter indicates copy-one-generation or copy-never, the process proceeds to operation S2.

In operation S2, the second determination unit determines whether a label in a quadlet of standard AM824 format data including a data channel read by the IEEE 1394 reception controller 11 has a value of 4X or any other value. If the label has a value of 4X, the process proceeds to operation S3. If the label has a value other than 4X, the process proceeds to operation S4.

In operation S3, the decryption controller outputs a selection signal for selecting the signal at the input terminal IN0 of the selector. Then, the decryption process ends.

In operation S4, the first decryption unit decrypts the quadlet of standard AM824 format data including the data channel read by the IEEE 1394 reception controller using the sy parameter. Then, the process proceeds to operation S5.

In operation S5, it is determined whether the label in the AM824 format data decrypted in operation S4 has a value of 4X or a value other than 4X. If the label has a value of 4X, the process proceeds to operation S6. If the label has a value other than 4X, the process proceeds to operation S7.

In operation S6, the decryption controller outputs a selection signal for selecting the signal at the input terminal IN1 of the selector. Then, the decryption process ends.

In operation S7, the second decryption unit decrypts the quadlet of standard AM824 format data including the data channel read by the IEEE 1394 reception controller using a value other than the sy parameter (e.g., copy-one-generation if the sy parameter indicates copy-never, or copy-never if the sy parameter indicates copy-one-generation). Then, the process proceeds to operation S8.

In operation S8, the decryption controller outputs a selection signal for selecting the signal at the input terminal IN2 of the selector. Then, the decryption process ends.

The process according to the flowchart shown in FIG. 16 ensures that each audio content encrypted with copy-one-generation or copy-never can be decrypted.

The IEEE 1394 receiver 10 according to the second embodiment receives audio data content of a plurality of channels through a single content packet. Therefore, the IEEE 1394 receiver 10 according to the second embodiment can handle a packet having a single header portion, and the overhead of the IEEE 1394 packet can be reduced.

Embodiments of the present invention are not limited to the first or second embodiment, and it is to be understood that a variety of improvements and modifications can be made without departing from the scope of the invention.

The first and second embodiments provide an IEEE 1394 transmitter and IEEE 1394 receiver having a three-wire interface for transmitting and receiving audio data content of up to 24 channels. However, embodiments of the present invention are not limited to the first or second embodiment, and can also provide an IEEE 1394 transmitter and IEEE 1394 receiver having a three-wire interface for transmitting and receiving audio data content of a smaller number of channels such as eight channels.

Example embodiments of the present invention have now been described in accordance with the above advantages. It will be appreciated that these examples are merely illustrative of the invention. Many variations and modifications will be apparent to those skilled in the art.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A transmitter conforming to IEEE 1394 for transmitting a plurality of audio data contents, comprising:
   an audio data generator configured to sample the plurality of audio data contents sequentially to generate format data of an audio data content, each of the plurality of audio data contents corresponding to a plurality of channels;
   a transmission controller configured to add a header packet to the format data of the audio data content; and
   an encryption portion configured to encrypt data corresponding to each of the plurality of channels based on an encryption instruction signal indicating a level for the encryption corresponding to each of the plurality of channels.

2. The transmitter according to claim 1, further comprising:
   a phase-locked loop configured to generate a common clock for receiving the plurality of audio data content.

3. The transmitter according to claim 1, further comprising:
   an encryption portion configured to encrypt the format data of the audio data content.

4. The transmitter according to claim 3, wherein the encryption portion encrypts the format data of the audio data content using 5C-DTCP protocol.

5. The transmitter according to claim 1, wherein the level for the encryption is one selected from a group consisting of copy-free, copy-one-generation, and copy-never.

6. The transmitter according to claim 1, further comprising:
   a label generator configured to generate a label for generating the format data of the audio data content.

7. An receiver conforming to IEEE 1394, comprising:
   a reception controller configured to separate format data of an audio data content from a received packet;
   an audio data content generator configured to generate a plurality of audio data contents from the separated format data of an audio data content on the basis of audio data content separation information, each of the plurality of audio data contents corresponding to a plurality of channels; and
   a decryption portion configured to decrypt data corresponding to each of the plurality of channels based on a signal indicating a level for decryption corresponding to each of the plurality of channels.

8. The receiver according to claim 7, further comprising:
   a phase-locked loop configured to generate a common clock for transmitting the plurality of audio data content.

9. The receiver according to claim 7, further comprising:
   a second determination portion configured to determine whether a label included in the separated format data of the audio data content has a predetermined value.

10. The receiver according to claim 7, further comprising:
    a plurality of decryption portions configured to decrypt the separated format data of the audio data content; and
    a selector portion configured to select signals from the plurality of decryption portions.

11. An audio data content transmission method conforming to IEEE 1394, comprising:
    separating format data of an audio data content from a received packet;
    generating a plurality of audio data contents from the separated format data of an audio data content on the basis of audio data content separation information, each of the plurality of audio data contents corresponding to a plurality of channels;
    decrypting data corresponding to each of the plurality of channels based on a signal indicating a level for decryption corresponding to each of the plurality of channels; and
    transmitting the plurality of audio data contents.

12. The audio data content transmission method according to claim 11, wherein the plurality of audio data contents are output on the basis of a common clock signal generated by a phase-locked loop.

13. The audio data content transmission method according to claim 11, further comprising:
    decrypting a first separated format data of audio data content into a first decrypted format data of audio data content according to a first encryption level;
    decrypting a second separated format data of audio data content into a second decrypted format data of audio data content according to a second encryption level;
    selecting from a group consisting of the first decrypted format data of the audio data content and the second decrypted format data of the audio data content; and
    generating the plurality of audio data contents.

* * * * *